Figure 7:
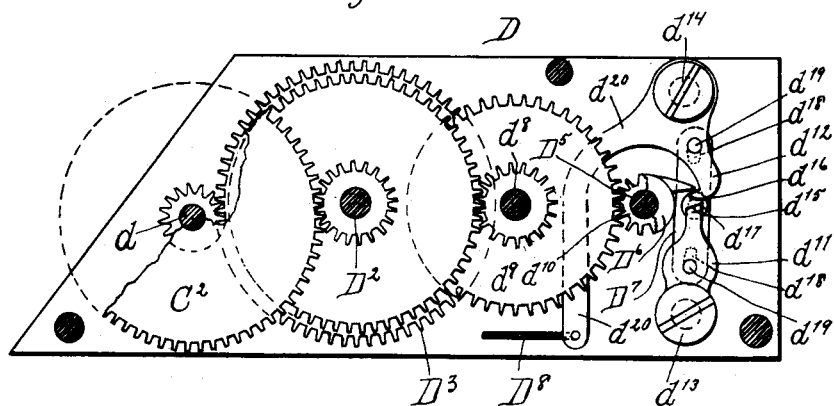

No. 610,170. Patented Sept. 6, 1898.
J. W. DEÜBNER.
WORKMAN'S TIME RECORDER.
(Application filed Feb. 20, 1897.)
(No Model.) 7 Sheets—Sheet 1.
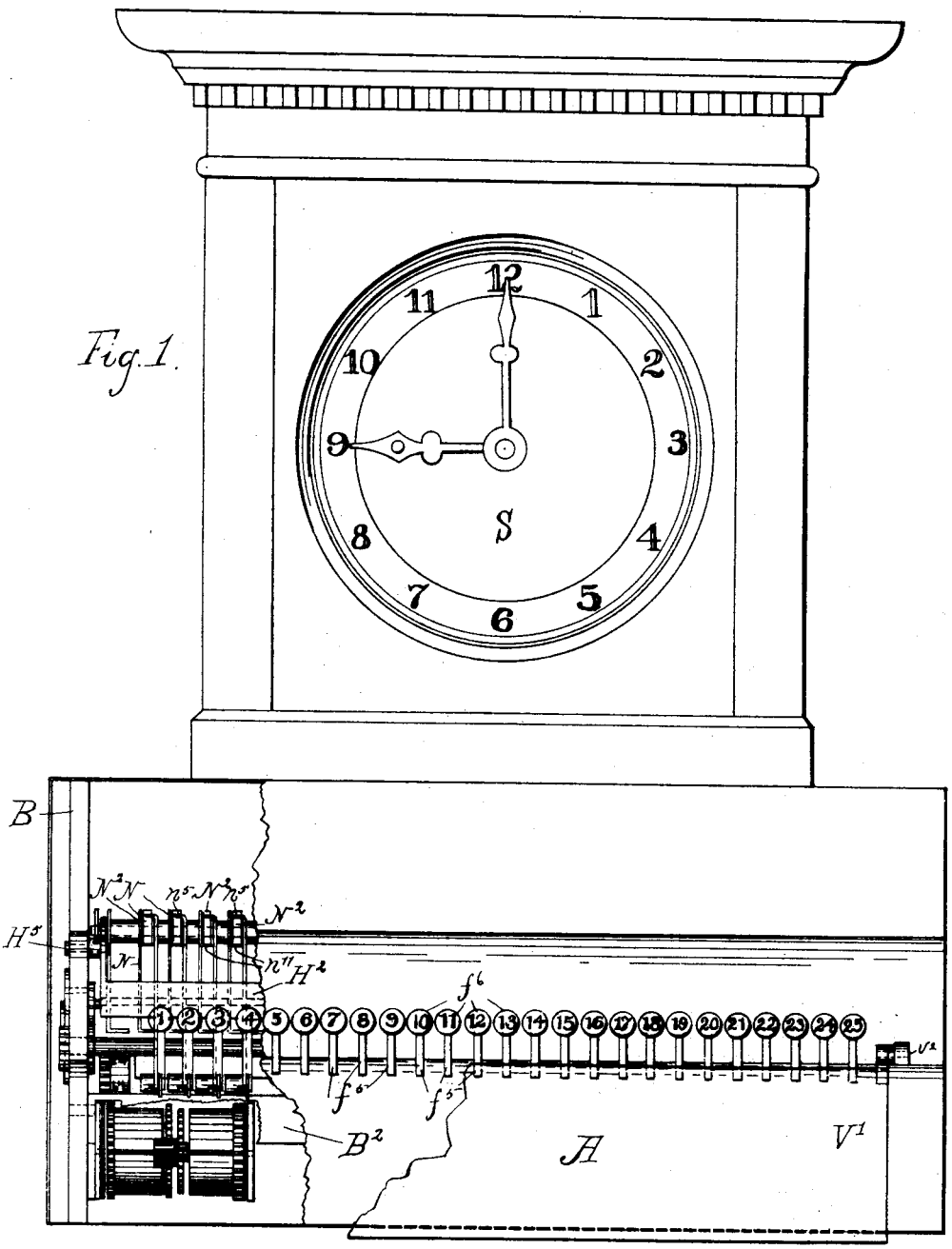
WITNESSES:
Glenn S. Noble.
E L Graves
INVENTOR
John W. Deübner.
BY
Carter & Graves
ATTORNEYS.

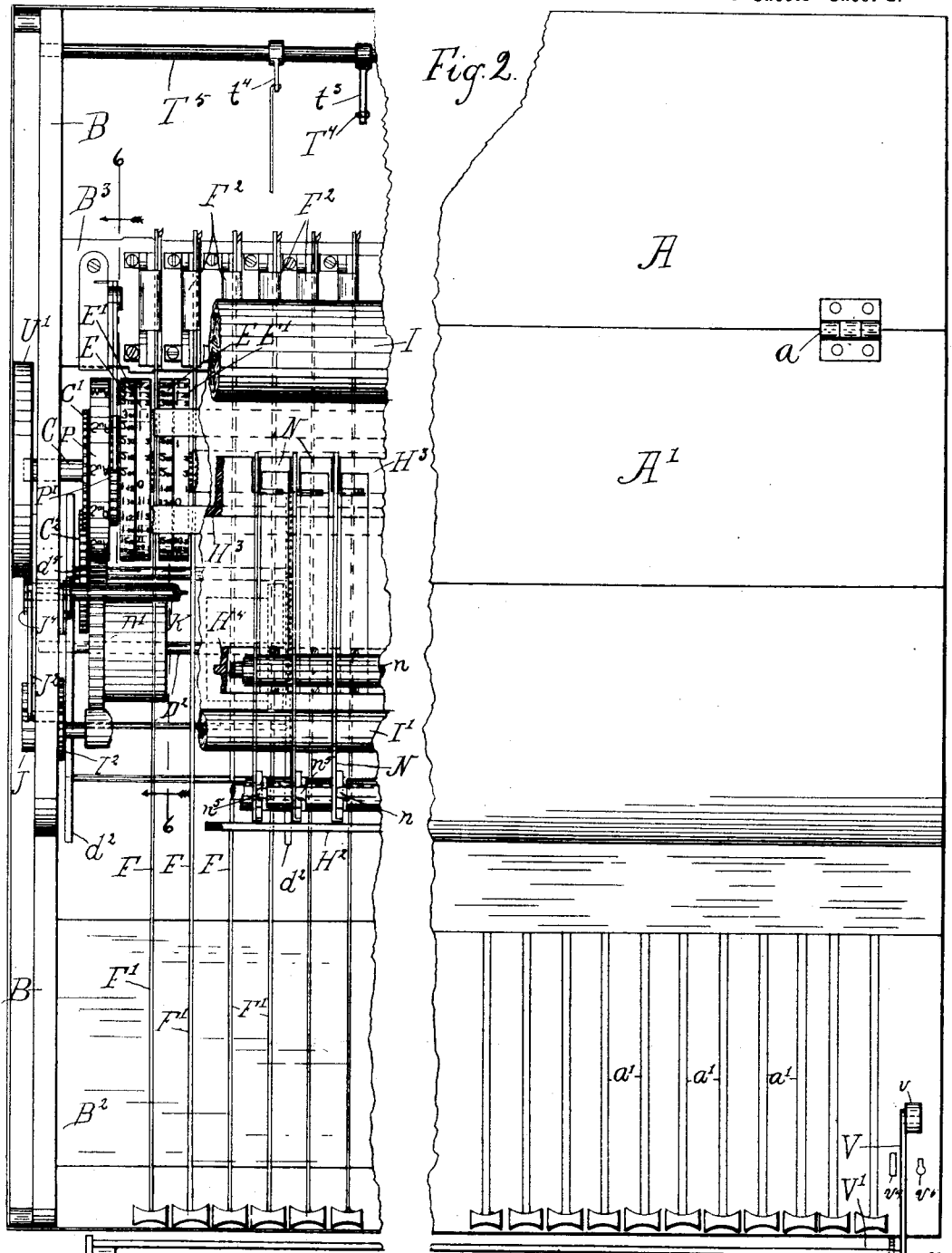

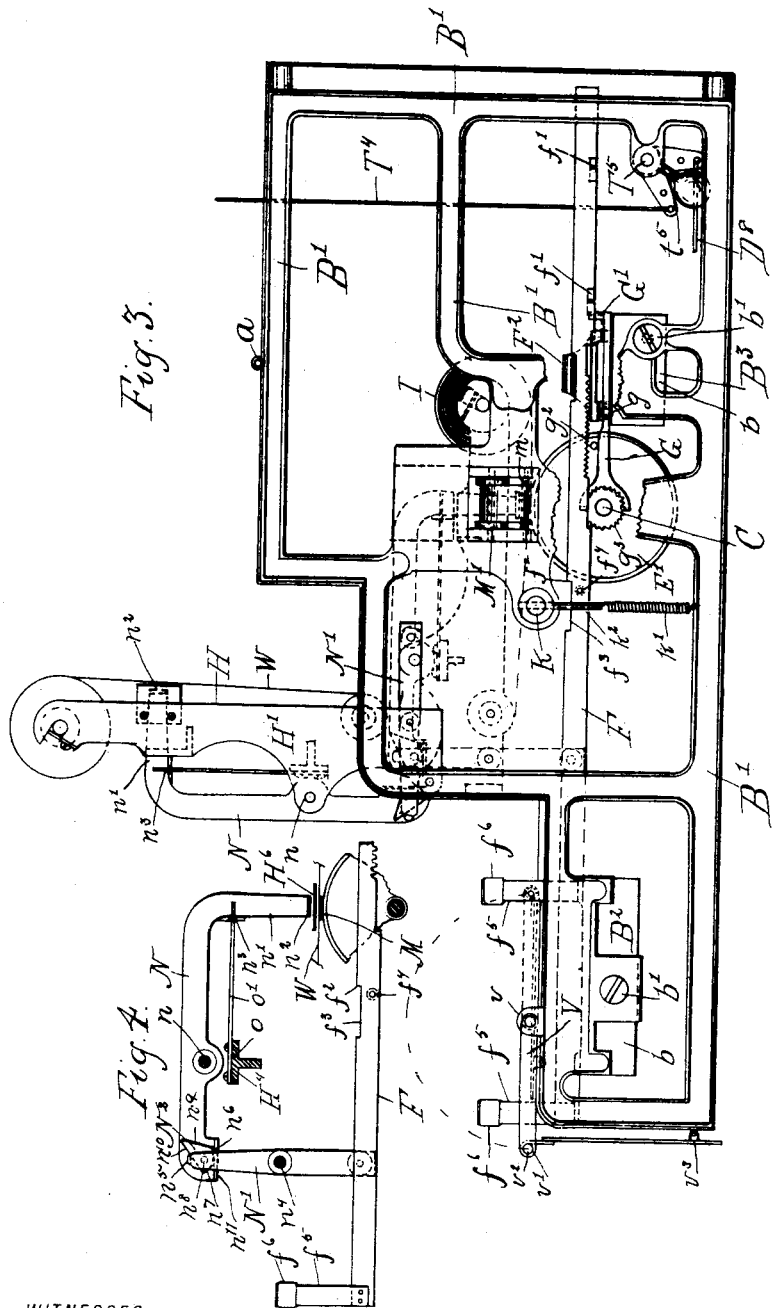

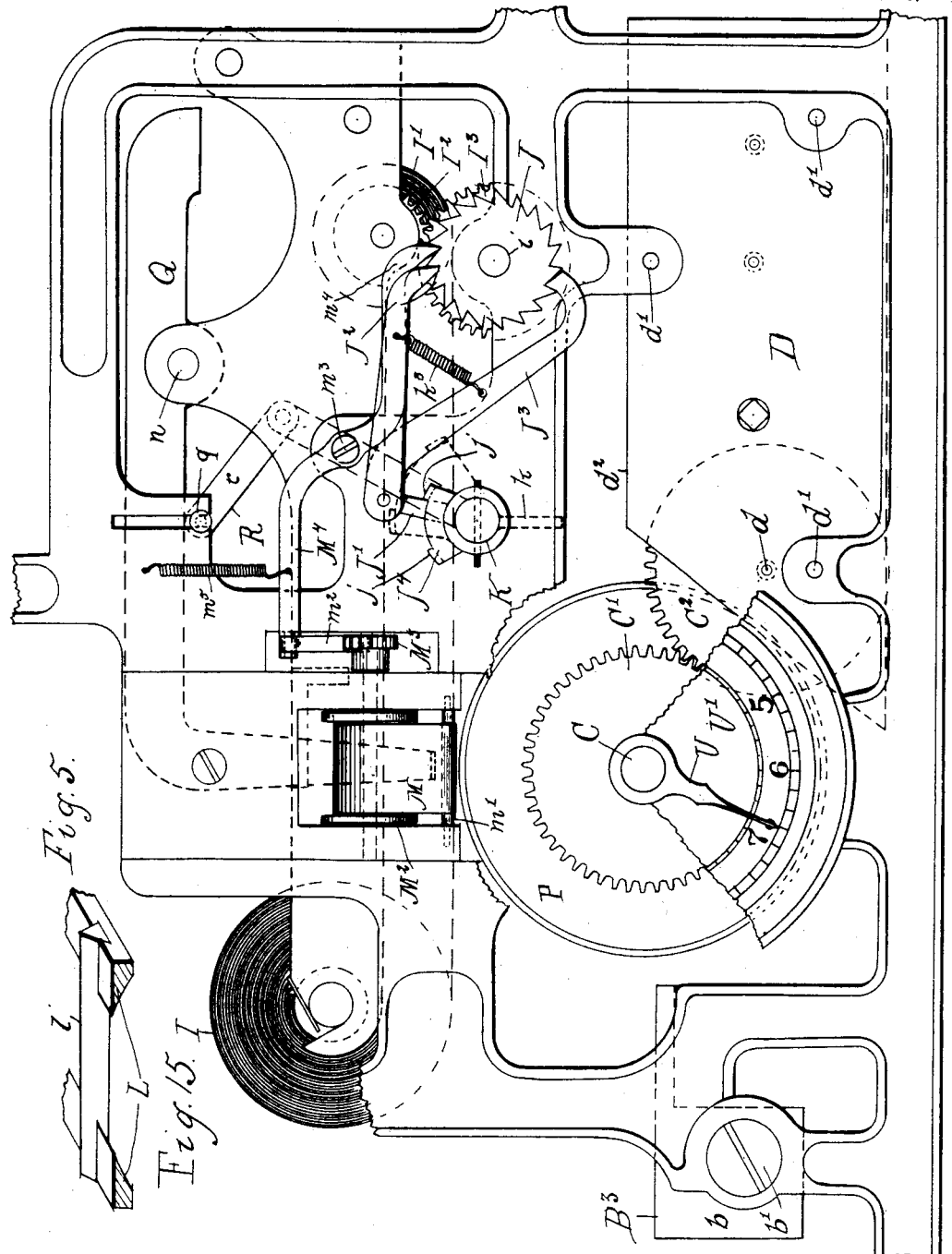

No. 610,170. Patented Sept. 6, 1898.
J. W. DEÜBNER.
WORKMAN'S TIME RECORDER.
(Application filed Feb. 20, 1897.)
(No Model.) 7 Sheets—Sheet 5.
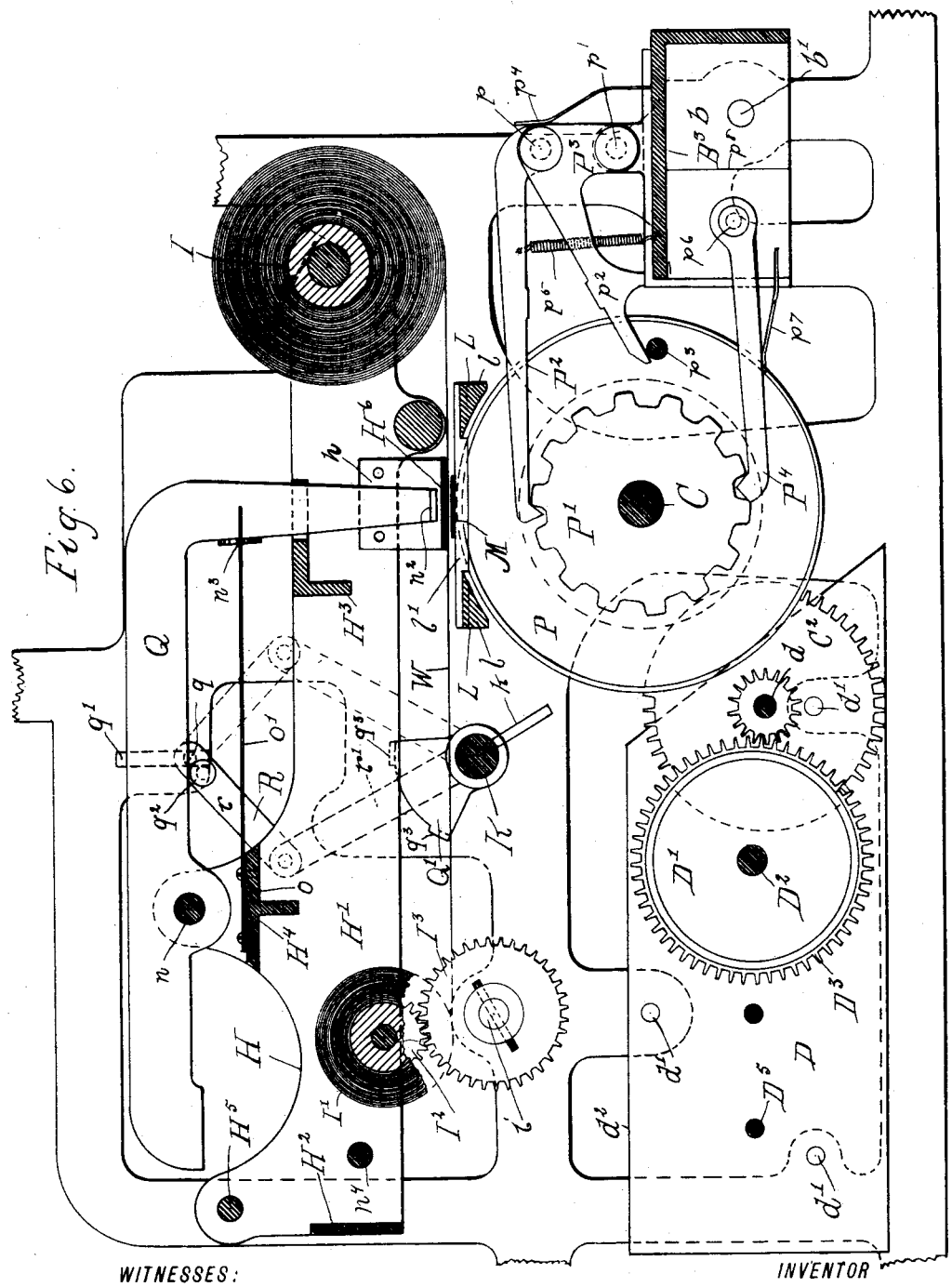
WITNESSES:
Glenn S. Noble.
E L Graves
INVENTOR
John W. Deübner,
BY
Carter Graves,
ATTORNEYS.

No. 610,170. Patented Sept. 6, 1898.
J. W. DEÜBNER.
WORKMAN'S TIME RECORDER.
(Application filed Feb. 20, 1897.)
(No Model.) 7 Sheets—Sheet 6.

WITNESSES:
Glenn S. Noble
E L Graves

INVENTOR
John W. Deübner
BY Carter & Graves
ATTORNEYS.

No. 610,170. Patented Sept. 6, 1898.
J. W. DEÜBNER.
WORKMAN'S TIME RECORDER.
(Application filed Feb. 20, 1897.)
(No Model.) 7 Sheets—Sheet 7.
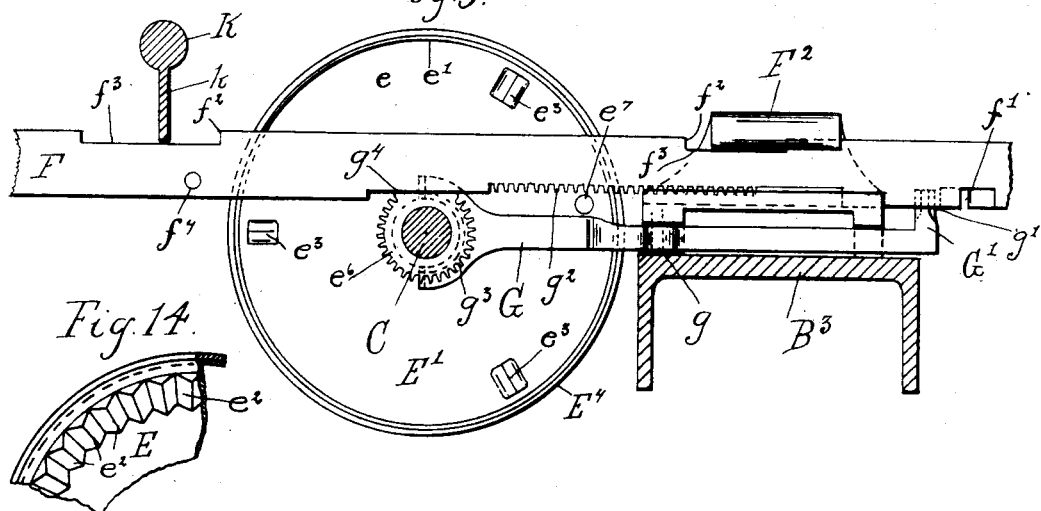
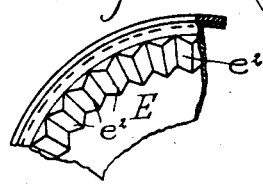
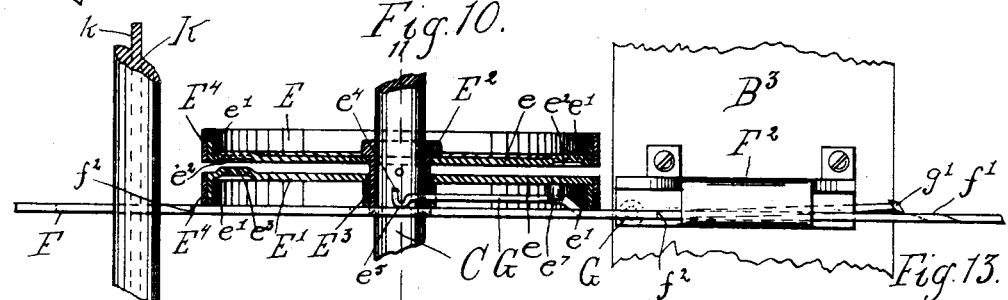
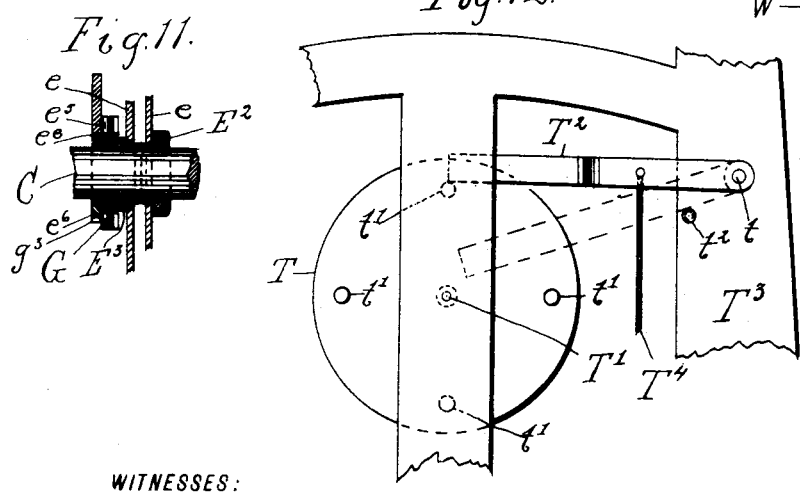
WITNESSES:
Glenn S. Noble.
E L Graves
INVENTOR
John W. Deübner
BY
Carter & Graves
ATTORNEYS.

UNITED STATES PATENT OFFICE.

JOHN W. DEÜBNER, OF CHICAGO, ILLINOIS, ASSIGNOR, BY DIRECT AND MESNE ASSIGNMENTS, TO THE CHICAGO TIME REGISTER COMPANY, OF SAME PLACE.

WORKMAN'S TIME-RECORDER.

SPECIFICATION forming part of Letters Patent No. 610,170, dated September 6, 1898.

Application filed February 20, 1897. Serial No. 624,375. (No model.)

*To all whom it may concern:*

Be it known that I, JOHN W. DEÜBNER, a citizen of the United States, residing at Chicago, in the county of Cook and State of Illinois, have invented certain new and useful Improvements in Workmen's Time-Recorders, of which the following is a specification.

This invention relates to improvements in time-recorders for recording the individual time of each of a body of workmen or for other analogous use, and relates more specifically to improvements in recorders of that type wherein each workman is allotted an individual key, which upon being operated at the beginning and end of an interval of time to be recorded prints a permanent record upon a suitable recording-sheet.

The object of the invention is to simplify and improve the construction generally of a machine of the type referred to, whereby the same is rendered more convenient of use, more accurate and certain in its operation, less liable to get out of order, and at the same time its cost of manufacture materially reduced.

The invention consists in the matters hereinafter described, and more particularly pointed out in the appended claims, and the same will be more readily understood by reference to the accompanying drawings, forming a part of said description.

In a machine of the present type a plurality of sets of type-wheels are arranged side by side upon a common shaft, which is rotated by suitable clock-controlled mechanism step by step at regular intervals of time, each set of type-wheels comprising a pair, one secured rigidly upon the said shaft and moving with the latter and the other mounted loosely upon the shaft and normally stationary, but adapted to be locked to the moving wheel or shaft, so as to move with the fast wheel during the period of time being recorded. A continuous web of paper or recording-sheet is carried over said type-wheels by means of suitable paper-feeding mechanism, and individually-operable impressing devices are arranged to take impressions upon the recording-sheet from the combination of characters presented at the printing-point by any given set of type-wheels at the time or times of making the record.

Figure 8:
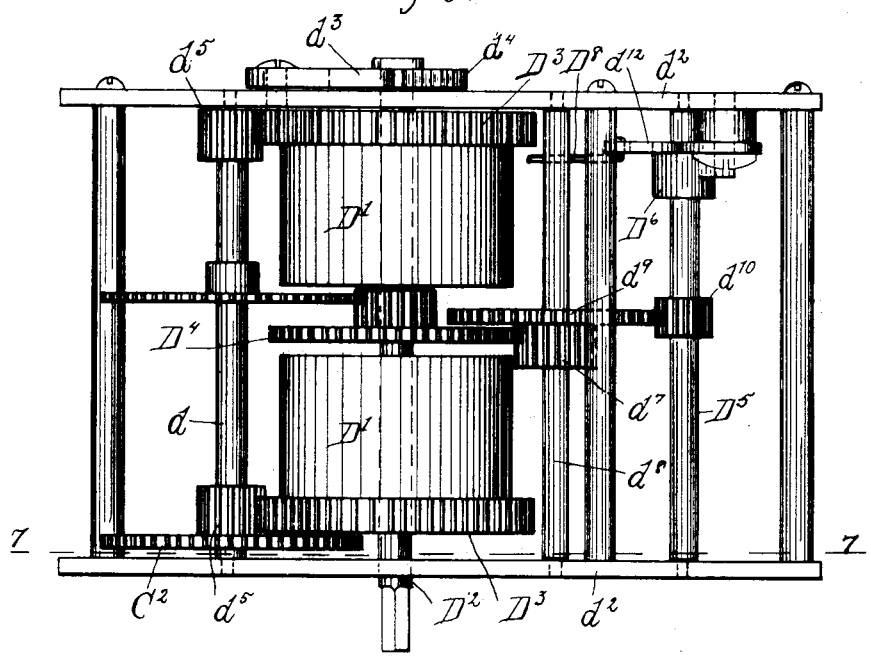

Referring to the drawings, Figure 1 is a front elevation of a machine embodying my invention, a part of the outer front casing being broken away to expose the arrangement of mechanism within. Fig. 2 is a top plan view of the same, the clock being removed from its position upon the case, a part of the top wall of the casing being broken away to expose the arrangement of mechanism within and a part of the paper-rolls, the recording-sheet, and the impressing devices and their supports being also broken away to expose the arrangement of the type-wheels, the spring-motor and connecting-train, and the key-bars beneath said recording mechanism. Fig. 3 is a side elevation of the machine, the outer casing being removed and the frame carrying the impressing devices shown uplifted to afford inspection of the recording-sheet, parts of the skeleton side frame being broken away to expose parts behind the same. Fig. 4 is a fragmentary detail showing the parts which form one set of impressing devices in side elevation. Fig. 5 is a view, similar to Fig. 3, of the central portion of the opposite end of the machine, parts of the frame and of the dial mounted upon the outer side of said frame being broken away to expose other parts behind, said view being made on a larger scale. Fig. 6 is a longitudinal vertical sectional view taken on line 6 6 of Fig. 2 and looking in the direction of the arrows. Fig. 7 is a longitudinal vertical sectional view of the spring-motor, taken on line 7 7 of Fig. 8. Fig. 8 is a top plan view of said spring-motor. Fig. 9 is a fragmentary detail, in longitudinal vertical section, of one of the type-wheels and the key-bar and shipping-lever which act thereon. Fig. 10 is a top plan view of the parts shown in Fig. 9. Fig. 11 is a transverse vertical sectional view taken on line 11 11 of Fig. 10, the shaft being shown in side elevation. Fig. 12 is a fragmentary detail of the escapement of the clock which controls the trip mechanism of the spring-motor. Fig. 13 is a fragmentary view of a portion of a recording-sheet, showing the form of record produced by the machine. Fig. 14 is a fragmentary perspective view of the periphery of one of the fixed type-wheels, showing particularly the V-shaped recesses therein. Fig. 15 is a fragmentary perspective view of the rubber supporting-bar and cross-supports of the same.

In said drawings, A designates as a whole an outer sheet-metal casing, the central top portion A' of which is hinged, as indicated, at $a$, so as to lift up to afford access to the interior of the machine, the front edge of said lifting portion or cover terminating at the inner angle of the recess which forms the key-bank inset or rabbet of the casing.

Within the casing A is arranged a skeleton frame within and upon which the entire operative mechanism of the machine is mounted, said skeleton frame consisting generally of upright skeleton side frame members B B', extending throughout the full length of the machine, at each side thereof, and transverse frame members $B^2$ $B^3$, which extend between and serve to unite the side frame members to form a rigid frame structure. The several bars of the side frame members are preferably, and as shown herein, of channel construction in cross-section, so as to reduce the weight of the same as much as possible. The cross-frame members preferably have the form of relatively large hollow or channel-shaped rectangular bars, the upper surfaces of which are of considerable width and serve to form horizontal supporting-tables for purposes hereinafter described, the ends of the said cross-bars which abut against the side frame members being provided with integral end plate portions $b$, through which are inserted the securing-bolts $b'$.

Referring now to the operative mechanism, C designates a main shaft mounted in suitable bearing-apertures, so as to extend transversely across the machine at the central lower portion thereof. Upon said shaft adjacent to the inner surface of one of the side frame members is keyed a gear-wheel C', (see Figs. 2 and 5,) which intermeshes with an idle-pinion $C^2$, mounted upon the shaft $d$ of a spring-motor D, arranged in the lower part of the machine immediately in front of the type-wheel shaft C.

The motor D, which is of a common type in general use, need not be particularly described, but consists generally of a suitable rectangular frame secured rigidly to the side frame member B by means of screw-bolts $d'$ and supporting between its side frame members or plates $d^2$ a pair of spring-actuated drums D' and two trains of gearing actuated from said drums, one serving to transmit motion to the type-wheel shaft C and the other being a multiplying-train arranged to transmit motion to a rotary escapement or trip through the medium of which the spring-motor is controlled. Describing said parts, $D^2$ designates the main shaft of the motor, upon which are mounted the two spring-actuated drums, one end of said shaft being squared and arranged to project through the keyhole formed in the outer casing to receive a key by means of which the motor may be wound up. A suitable pawl-and-ratchet mechanism $d^3$ $d^4$, arranged at the opposite end of said shaft, serves to hold the shaft as it is wound up in the usual manner. Upon the peripheries of the drums are mounted concentric gears $D^3$, which act upon pinions $d^5$, mounted rigidly upon the shaft $d$, which carries the gear $C^2$, hereinbefore referred to. At a point between the drums a gear $D^4$ is mounted, which is arranged to intermesh with a pinion $d^7$, mounted upon a shaft $d^8$, and this shaft is provided also with a larger gear $d^9$, which is in turn arranged to intermesh with a pinion $d^{10}$, mounted upon the escapement-shaft $D^5$. Said escapement consists of a detent $D^6$, mounted rigidly upon said escapement-shaft and controlled by means of a pair of oscillatory pawls $d^{11}$ $d^{12}$, arranged to be alternately oscillated into the path of said detent, so as to permit a single revolution of the detent-shaft upon each forward-and-backward reciprocation of the pair of pawls. In order to accomplish this, the pawls $d^{11}$ $d^{12}$ are each pivotally mounted at one end, as at $d^{13}$ $d^{14}$, and arranged to project toward each other and adjacent to the path of the detent, the upper end of the pawl $d^{11}$ being provided with an oblique end surface $d^{15}$, adapted for engagement with the detent, while the opposite pawl is provided with a hooked end $d^{16}$ for the same purpose. In order to actuate said pawls simultaneously in opposite directions, so that when one is oscillated back to release the detent the other will be oscillated forwardly into the path of the latter, a lever $D^7$ is pivotally mounted midway of its length adjacent to said pawls, as at $d^{17}$, so as to oscillate in the same plane with the latter, provided in each end with slots $d^{18}$, which are engaged by studs $d^{19}$ upon the several pawls. The pawl $d^{12}$ is provided with a depending arm $d^{20}$, with the lower end of which is connected an actuating-rod $D^8$, which receives reciprocatory motion in a manner hereinafter described.

Referring now to Fig. 2, upon the shaft C are mounted a plurality of pairs of type-wheels E E', one pair for each key-bar across the entire width of the machine. (See detail Figs. 9, 10, and 11.) As herein shown, said type-wheels are made of sheet metal stamped or struck up into suitable form and each consisting of a disk $e$, provided at its margin with a cylindric flange portion $e'$, the flanges of the wheels of each pair being struck up in opposite directions, so as to permit the disk or body portions of the type-wheels to be brought closely adjacent to each other. In the body or disk portion of one of the wheels of each pair (in this instance the wheel E) is formed an annular series of V-shaped recesses $e^2$, while in the other member of the pair are formed a number of V-shaped projections or bosses $e^3$, adapted to be brought into engagement with the V-shaped recesses of the wheel E when said members are brought together upon the shaft, so as to lock one to the other rotatively. In the construction shown the type-wheel E is mounted rigidly upon a spacing-sleeve $E^2$, keyed or otherwise secured from rotation upon the shaft C, while the member E' is rigidly mounted upon a second sleeve-section $E^3$, which is rotatively mounted upon the sleeve $E^2$ and capable also of endwise movement thereon. The type or printing characters are formed upon a separate band $E^4$, of metal, which is suitably secured upon the cylindric flanged periphery of the type-wheel.

In the present embodiment of the invention the main shaft C and the type-wheels keyed thereon are arranged to make one complete revolution in each twelve hours, being moved forward step by step at the end of each interval of fifteen minutes or quarter-hour. The type-wheels E are each provided with characters corresponding to the hours of the day and intervening quarter-hours, so that the printing characters presented by said wheels at the printing-point at any determined time correspond approximately to the hour of day. The movable wheels E', however, which serve to indicate the length of time worked or the interval of time intervening between any two successive registrations, are provided with series of numerals running from "0" to "12" hours by quarter-hours. In the operation of the machine the fixed wheel moves forward regularly under the action of the clock mechanism, while the stationary wheel remains standing at zero until the workman commences work, whereupon it is shifted into locked engagement with the fixed wheel and thereafter moves with the latter until the workman quits work, whereupon it is released from the fixed wheel and returned to zero, impressions having been taken, both at the time when work was begun and when the workman quit, of the combinations of characters presented by the two type-wheels at the printing-point at these times. In order to effectuate this operation of the loose wheel, mechanism is provided as follows: F designates a series of key-bars, one for each set or pair of type-wheels, arranged to reciprocate or slide longitudinally in suitable bearings or guides upon the machine-frame. At their front ends said key-bars are supported and guided in slots or kerfs F', formed transversely in the upper surface of the front cross member $B^2$, while at their rear ends said bars extend through guide-brackets $F^2$, mounted upon the rear cross-frame member $B^3$ in longitudinal alinement with the respective guide-slots of the front frame member. Each key-bar is arranged to extend immediately adjacent to the loose type-wheel of the pair to which it belongs, as shown most clearly in Fig. 10.

G designates a shipping-lever pivotally mounted about midway of its length upon a pivot-stud $g$, arranged vertically directly beneath or in the same plane with said key-bar and at a point in rear of the type-wheels, as shown most clearly in Figs. 9 and 10, said pivot-stud being conveniently arranged to project downwardly from the lower surface of the guide-bracket F. The forward end of the shipping-lever is made yoke-shaped and arranged to embrace the loose sleeve $E^3$, the ends of the arms of said yoke being curved, so as to form shoulders $e^4$ $e^5$, adapted to engage the disk or body of the loose type-wheel and a circumferential flange $e^6$, formed upon the outer end of said loose sleeve, respectively, so as to move said type-wheel positively toward and from the fixed wheel as said lever is oscillated upon its pivot. In order to thus oscillate said lever when the key-bar is shifted, the rear or tail end of the shipping-lever is provided with an upturned portion G', upon which is formed a somewhat diamond shaped diagonally-arranged cam $g'$, which projects upwardly opposite the lower edge portion of the key-bar. The shipping-lever is made of spring metal and so shaped as to cause its rear end to tend to stand in the same plane with the key-bar, and the latter is provided in its lower edge with two cam-slots $f'$, extending diagonally therethrough and arranged at such distance apart and with such relation to the cam of the shipping-lever as to permit the latter to pass through one of said slots during the stroke of the key-bar in each direction. The result of this arrangement is that when the key-bar is started forward the shipping-lever is oscillated so as to throw the loose wheel over against the fixed wheel and into locked engagement with the latter, and when the key-bar is again returned to its normal innermost position the loose wheel is shifted back at the beginning of the return movement.

In order to return the loose type-wheel to zero each time, it is released from engagement with the fixed wheel as the key-bar is pushed inwardly. The lower edge of the key-bar is provided with a series of rack-teeth $g^2$, adapted to engage a corresponding series of gear-teeth $g^3$, formed in the periphery of the sleeve $E^3$. At the side of the loose wheel corresponding to the position of the zero-mark upon its periphery the gear-teeth $g^3$ are interrupted and the periphery of said sleeve-flange provided with a flattened portion $g^4$, which serves, by engagement with the straight lower edge of the key-bar, to arrest the type-wheel at the proper zero-point upon the return stroke of the key-bar. It is to be noted in this connection that the location of the rearmost slot $f'$ of the key-bar is such that the tail or upturned projection of the shifting-lever will not pass therethrough until the key-bar has been drawn forwardly a part of the length of its stroke, this construction being adopted to save making an unnecessary length of rack-teeth on the key-bar.

In order to arrest the loose type-wheel positively when it has reached the zero-point, a stop-stud $e^7$ is provided upon the outer face of said wheel, which is so located as to be brought into contact with the upper surface of the shifting-lever when the wheel has been rotated back to the zero-point. It will also be noted that this stud is short enough to pass by said shifting-lever at the time the loose wheel is shifted over to locked engagement with the fixed wheel and the angle between the shifting-lever and the face of the loose wheel thereby increased.

To next describe the mechanism by means of which impressions are taken from the type-wheels upon the recording-sheet, H designates as a whole a swinging frame consisting of side members H' and cross frame members $H^2$ $H^3$ $H^4$, arranged to extend between said side frame members at the front, rear, and central parts of the frame, respectively, as best indicated in sectional Fig. 6. The swinging frame H is practically the full width of the machine between the main side frame members of the latter and is hinged to said side frame members at its front upper part by means of pivots $H^5$, so as to permit the rear part of the frame to be lifted upwardly to permit inspection of the under surface of the recording-sheet containing the record.

I designates a supply-roll mounted in suitable bearings, so as to extend transversely of the swinging frame at the rear end of the latter, and I' designates a receiving or feed roll similarly mounted in the swinging frame near the front part of the latter.

In order to actuate the feed-roll so as to draw the recording-sheet from the supply-roll, the trunnion of the feed-roll is provided adjacent to its bearing in the side frame with a gear $I^2$, with which is arranged to intermesh a second gear $I^3$, mounted upon a short shaft $i$, arranged in a suitable bearing-aperture in the main side frame member B, said shaft being arranged to exten doutwardly through said frame and being provided at its outer end with a ratchet-wheel J, (see Fig. 5,) which is actuated as follows:

Referring now to Figs. 2, 6, and 9, K designates a rock-shaft arranged to extend transversely across the entire width of the machine at a point slightly above the upper edges of the key-bars and just in front of the type-wheels. The bar K is provided with a radially-extending flange $k$, which normally depends vertically downward in position to be engaged by shoulders $f^2$, formed at the proximate ends of recesses $f^3$, formed in the upper edge of each of the key-bars, said recesses being so located as to permit said web to depend at its lower edge within the same when the key-bar is at its limit of throw in either direction, and it being understood that the said web extends across the entire set of key-bars, so as to be engaged by any one of them which may be operated. The depending flange $k$ is held yieldingly downward in vertical position by means of a spring $k'$, which acts upon an arm $k^2$, mounted upon the end of said shaft opposite that at which the ratchet-wheel J is located and arranged to extend downwardly in the same plane with the web. (See Fig. 3.) The end of the rock-shaft, which is carried by the frame member B, is extended out through said frame members and is provided at a point outside of the same with a short arm J', (see Fig. 5,) loosely mounted thereon and carrying at its free end a pair of pivoted pawls—a push-pawl $J^2$, which is arranged to act upon the upper periphery of the ratchet-wheel, and a pull-pawl $J^3$, arranged to act upon the lower periphery of the same. The two pawls are held in yielding engagement with the ratchet by means of a coiled contractile spring $k^3$ connecting the same. In order to impart movement to said arm J' and the pawls carried thereby, a segmental-shaped tappet-block $J^4$ is mounted rigidly upon the end of the rock-shaft adjacent to said arm and provided with two lugs or projections $j$, which are adapted to contact with the opposite sides of the arm and oscillate the latter when the rock-shaft is operated, said lugs being arranged at such distance apart as to afford sufficient lost motion between the rock-shaft and the pawl-carrying arm to permit the web of the rock-shaft to assume a vertically-depending position after it has been oscillated in either direction by the key-bar without necessitating a return movement of the arm.

The relative arrangement of the several parts thus described is such that when a key-bar is shifted in either direction the web of the rock-shaft will be engaged by one of the shoulders $f^2$ of the key-bar and the rock-shaft thereby oscillated to cause the pawls to move the ratchet-wheel of the feed-roller forward one notch. The further movement of the key-bar will bring the recess of the latter, located at the opposite limit of its throw, in position to permit the web to resume its normal vertical position. After the first key-bar has been thus moved in any given direction it will be obvious that the movement of any one or more succeeding key-bars in the same direction will have no effect upon the feed-roll, since the rock-shaft will simply be oscillated idly without moving the pawls. When, however, the first key-bar is shifted in an opposite direction, the rock-shaft will shift the pair of pawls in the opposite direction and the feed-roll will be again moved forward a step. The advantage of this arrangement is to keep the records of the entire body of workmen in transverse rows upon the recording-sheet unless they pass in and out promiscuously.

Next describing the impressing devices by means of which the recording-sheet and a subjacent inking-ribbon are forced against the type-wheels to take the impressions therefrom, L designates a guide-bar (see sectional Fig. 6) arranged to extend transversely above and in close proximity to the type-wheels, said bar consisting of two parallel members $l\ l$, of generally triangular form in cross-section, arranged at a distance apart and connected by means of cross ribs $l'$, extending between each pair of type-wheels, the relative arrangement of the two parallel members of the bar being such as to afford space between them for the peripheries of the type-wheels to project or rise to a point nearly but not quite flush with the upper surfaces of the connecting-ribs $l'$. The purpose of the said connecting-ribs is both to support the inking-ribbon and recording-sheet free from the type-wheels and also to form scoring devices which operate upon the recording-sheet to divide the latter into vertical columns, said ribs being for the latter purpose made knife-edged at their upper edges. A further and important function of the supporting-ribs is to prevent the recording-sheet from being forced into contact with the type-wheels except at the point which is directly acted upon by the individual impressing device being operated, as will hereinafter more fully appear.

M designates the inking-ribbon, which is arranged to extend transversely across the entire set of type-wheels between the recording-sheet and the latter, one end of said ribbon passing out through a suitable opening in the frame member $B'$ and beneath a guide-roller $m$ and wound upon a delivery-roll $M'$, mounted parallel with the guide-roller above the latter, (see Fig. 3,) while the other end passes similarly out through the frame member B, beneath a guide-roller $m'$, and thence upwardly and around a receiving-roll $M^2$, mounted in suitable bearings in the frame member B. One trunnion of the feed or receiving roll is provided with a ratchet-wheel $M^3$, which is acted upon by a push-pawl $m^2$, carried by the end of a vibratory lever $M^4$. The vibratory lever is pivoted between its ends, as at $m^3$, so as to oscillate vertically in the same plane with the ratchet-wheel J, and the end of said lever opposite that carrying the push-pawl is provided with a wiper or nose $m^4$, which engages the ratchets of said ratchet-wheel J, and is thereby oscillated each time the latter wheel is moved forward a notch, thus imparting a corresponding movement to the feed-roller of the ribbon. The lever $M^4$ is held in yielding engagement with the ratchet-wheel J by means of a coiled spring $m^5$, suitably secured at one end to said lever and attached at its opposite end to a stud upon the frame above the latter.

To now describe the hammer or impressing devices proper and the mechanism whereby they are actuated, N designates a plurality of L-shaped hammers, one for each pair of type-wheels, pivotally mounted between their ends upon a pivot-rod $n$, arranged to extend transversely from end to end of the swinging frame H. The rear downturned end portion $n'$ of each hammer is arranged to depend immediately above and adjacent to the corresponding pair of type-wheels and is provided at its lower end with a head or impressing-block $n^2$ of sufficient width to reach across both type-wheels of the pair and the corresponding scoring-rib belonging to said pair.

In order to throw the impressing-hammers downwardly into contact with the recording-wheels after they have been lifted in a manner hereinafter described, independent springs are provided for each, arranged as follows: The cross frame member $H^4$ is arranged to extend transversely across the central part of the swinging frame and is provided at its upper side with a flat surface $o$, upon which are secured flat plate-springs $o'$, one for each impressing device. The said springs project horizontally rearward and engage at their rear ends with notches $n^3$, formed in the depending parts of the several hammers, said springs being so arranged as to normally hold the impressing-faces of the hammers adjacent to but free from contact with the recording-sheet, so as to insure a rebounding action when the hammers are thrown downwardly into contact with the recording-wheels by the spring.

$N'$ designates vertically-arranged actuating-levers pivotally mounted upon a second pivot-rod $n^4$, arranged to extend parallel with the rod $n$ in the front part of the swinging frame and vertically beneath the front ends of the impressing-hammers. The upper end of each actuating-lever is provided with an L-shaped or hooked end portion $n^5$, which overhangs and is adapted to act upon a reversible cam-block $N^2$, pivotally mounted upon the end of the hammer. The cam-blocks are of irregular diamond shape, each having a base portion provided with two sides $n^6\ n^7$, (see detail, Fig. 4,) arranged to meet at an obtuse angle and adapted to alternately engage or rest upon a horizontal flange $n^{11}$, formed upon the end of the impressing-hammer immediately beneath the pivotal support $n^8$ of the cam-block, and a wedge-shaped upper portion having converging sides $n^9\ n^{10}$, forming the cam-surfaces upon which the end of the actuating-lever acts. The shape of the cam-block is such that when one of its base sides rests in contact with the underlying flange $n^{11}$ one of its cam-surfaces will be held vertical and the opposite cam-surface inclined obliquely upward and away from the end of the actuating-lever, and, vice versa, when the cam is tilted over so that the other base side rests in contact with the flange the positions of the two cam-surfaces will be reversed.

The lower end of each actuating-lever depends alongside of or adjacent to the corresponding key-bar (see Figs. 1 and 4) in position to be engaged and oscillated by a stud $f^4$, carried by the said key-bar. The relative position of the stud is such that as the key-bar approaches the end of its forward movement the stud will engage the lower end of the actuating-lever and carry it forwardly, thus causing its upper end to act upon the inclined surface $n^9$ of the cam, so as to depress the end of the hammer until the end of the actuating-lever passes entirely over the cam-block, whereupon the hammer will be thrown downward by its spring, so as to force the recording-sheet into contact with the recording-wheels and thus take an impression of the printed characters presented at the different points at this moment. A still further movement of the key-bar forward carries the stud thereon out of engagement with the actuating-lever and permits the latter to swing back to its normal position. In order to insure this latter action, the lower end of the actuating-lever is weighted, as indicated at $n^{11}$. Upon the return movement of the key-bar the actuating-lever will be again engaged by the stud $f^4$ and oscillated in the opposite direction. As soon as its upper end comes into contact with the reversible cam-block the latter will be tilted over, so as to bring its front cam-surface into inclined position with relation to the actuating-lever, and the impressing-hammer will be operated upon the return stroke in the same manner as hereinbefore described.

In order to render the impressions upon the recording-sheet more uniform, I provide a cushioning-strip $H^6$, of thin felt or analogous material, which is arranged to extend across the machine beneath the impressing-hammers and between the latter and the recording-sheet W, said strip being conveniently secured at its ends to the side frame members of the swinging frame by means of clips $h$.

The machine herein described is designed to run continuously from week to week, and inasmuch as the type-wheels fixed upon the main shaft are so operated as to make one complete revolution each twelve hours, as hereinbefore stated, it is necessary that some means be provided for identifying which part of the day any given record refers to—whether made during the antemeridian or postmeridian period. It is also highly desirable that the days of the week be indicated upon the recording-sheet. I have therefore shown herein mechanism, which may be conveniently designated "dating mechanism," by means of which a type-wheel provided upon its periphery with characters designating the several days of the week and the antemeridian and postmeridian parts of the several days is so actuated automatically as to present at the printing-point the proper dating characters, together with mechanism by means of which an impression is taken from said date-wheel each time the recording-sheet is moved.

Referring to Fig. 6, P designates a type-wheel, preferably of the same diameter and general construction as the recording-wheels hereinbefore described and mounted loosely upon the main shaft C, in the present instance at the left-hand end of said shaft immediately adjacent to the first pair of recording-wheels. Upon the side of the date-wheel next the recording-wheel is secured concentrically a ratchet-wheel P', provided in its periphery with a series of fourteen ratchet-notches, two for each of the seven days of the week. The said ratchet-wheel is acted upon by means of a push-pawl $P^2$, which is pivoted at its opposite end to a bent lever $P^3$ at the angle thereof, as indicated at $p$. The bent lever is in turn pivotally mounted at the lower end of its shorter arm, as at $p'$, to a suitable bracket-support upon the cross frame member $B^3$. The longer arm $p^2$ of the bent lever is arranged to extend obliquely forward and downwardly adjacent to the proximate recording-wheel and in position to be engaged and lifted by a stud $p^3$, carried by said recording-wheel. The length of the arm $p^2$ with relation to the path of the stud $p^3$ is such that the bent lever will be lifted far enough to retract the push-pawl sufficiently to permit it to engage the next notch of the ratchet-wheel each time the said stud is carried by in the rotation of said recording-wheel. When the stud is carried around a sufficient distance to permit the end of the bent lever to pass out of engagement therewith, said lever is returned to its normal position by means of a spring $p^4$, mounted upon the cross frame member and arranged to bear against the angle of said lever, as indicated clearly in said Fig. 6. Obviously when the bent lever is returned to its normal position by said spring the push-pawl $P^2$ will be thrust forward, so as to rotate the date-wheel one notch. The push-pawl is held in yielding engagement with the ratchet-wheel by means of a coiled spring $p^5$, attached thereto and to a subjacent part of the frame.

In order to hold the date-wheel from movement while the push-pawl is being retracted, a detent $P^4$ is arranged to act upon the under side thereof, said detent being pivoted to a suitable support $p^8$ upon the under side of the cross frame member $B^3$, as indicated at $p^6$, and being held in yielding engagement with the ratchet-wheel by means of a spring $p^7$. The acting end of the detent is shown as made V-shaped and of sufficient width to fully occupy the notches of the ratchet-wheel, the purpose of this construction being to cause the detent to bring the date-wheel into exact printing register with the impressing device each time said date-wheel is moved.

Describing the impression device by means of which impressions are taken from the date-wheel each time the recording-sheet is moved, Q designates an impressing-hammer substantially similar to the impressing-hammer heretofore described, except that the cam-block is omitted from the rear end thereof and mounted upon the same pivot-rod $n$ at a point in the same plane with the date-wheel.

R designates a toggle consisting of two links $r\ r'$, one of said links being pivotally mounted at one end upon the rock-shaft K, while the opposite end of the toggle is arranged to slide vertically upon the side frame member B by means of a guide-stud $q$ upon the end of the toggle, which engages a slot $q'$, formed vertically in said frame. The upper end of the toggle is also provided with a second inwardly-projecting stud $q^2$, which extends beneath the lower edge of the impressing-hammer Q and is adapted to lift the latter when the toggle is flexed, so as to bring its links into alinement, the relative length of said links being such as to hold the toggle in flexed position when the impressing-hammer is in its normal position, as indicated clearly in the drawings. In order to operate said toggle, a tappet-block Q', substantially similar to the tappet-block $J^4$ hereinbefore described, is mounted upon the rock-shaft K adjacent to the link $r'$ and provided with tappet projections $q^3$, adapted for contact with the opposite side of said link. The relative position of the tappet projections $q^3$ is such that when the rock-bar is oscillated by the key-bar, so as to move the recording-sheet, as hereinbefore described, the toggle will be straightened, so as to lift the hammer, and thereafter carried beyond a vertical position in such manner as to permit the hammer to drop under the action of its spring. At the same time the distance between the said tappet projections is such as to afford the required lost motion to permit the web of the rock-bar to return to a vertical position in the same manner as hereinbefore described in connection with the operation of the feeding of the recording-sheet. When the recording-sheet is again moved, the toggle will be again flexed in the opposite direction and the hammer again operated in an obvious manner.

It has been stated that the spring-motor is so controlled by clock mechanism as to permit it to move the recording-wheels forward a step at the end of each quarter-hour. To now describe said clock mechanism and its connection with the motor, S designates as a whole a clock mounted upon the rear part of the machine. Said clock may be of any usual or suitable construction so far as its general features are concerned, that herein illustrated being of a well-known type.

Referring now to detail Fig. 12, T designates a disk mounted rigidly upon the minute-hand shaft T' of said clock at any suitable point within the casing of the latter. $T^2$ designates an escapement-lever pivotally mounted at one end, as at $t$, to a part of the clock-frame $T^3$, so as to oscillate in the same plane with said disk. The free end of said lever is arranged to extend adjacent to the side of the disk, which latter is provided with four studs $t'$, spaced at uniform distances apart and adapted to act successively upon the end of said lever, so as to lift the lever and permit it to drop as the disk is rotated, the downward movement of said lever being limited by means of a suitable stop, as indicated at $t^2$.

$T^4$ designates an actuating-rod connected at its upper end with the escapement-lever at a point between the ends of the latter and arranged to extend downwardly through a suitable opening in the casing of the time-recorder to a point in the rear lower part of the latter.

$T^5$, Figs. 2 and 3, designates a rock-shaft mounted in suitable bearings to extend transversely in the rear lower part of the time-recorder and provided with two rigid arms $t^3$ $t^4$, arranged to extend radially therefrom and approximately at right angles to each other. The arm $t^3$ extends in an approximately horizontal direction, and the lower end of the actuating-rod $T^4$ is connected therewith, while the actuating-rod $D^8$ of the spring-motor, hereinbefore described, extends rearwardly from said motor and is connected with the end of the arm $t^4$, the said rock-shaft and arms thus forming in effect a bell-crank lever.

In order to insure the prompt and certain oscillation of the rock-shaft $T^5$ when the escapement-lever of the clock mechanism is permitted to drop, said rock-shaft is provided with a third projecting arm $t^5$, which is weighted at its outer end, as indicated clearly in said Fig. 3.

In order to facilitate the setting of the recording-wheels to correspond with the time of day indicated by the clock and also to enable the attendant to determine by inspection that the recording-wheels are in proper operation at all times, the main shaft C is extended out through the frame member B and provided outside of the latter with an indicating-hand U, which is arranged to traverse a dial U', seated in a suitable opening in the outer sheet-metal casing. Said dial will usually be divided into twelve divisions corresponding to the hours of the day and these divisions each divided into four smaller divisions, so that the indicating-hand moving with the main shaft will indicate the quarter-hour at which the machine stands, and consequently the date of the record which any workman operating his key at this time will make upon the recording-sheet.

As an auxiliary improvement I provide locking mechanism whereby the machine may be locked at any time, so as to hold all of the keys from movement in the positions in which they were last placed, whether it be at the inward or outward limit of their movements.

Referring to Figs. 1 and 3, it will be seen that the key-bars are each provided with a vertically-upturned end portion $f^5$, which carries at its upper end a suitable tip or finger-piece $f^6$. The upturned ends of the key-bars extend upwardly through and reciprocate within slots $a'$, formed in the top wall of the outer casing, the throw of the key-bar being limited at each end by the length of the slot. V designates two parallel arms pivotally mounted upon pivot-lugs $v$ upon the surface of the casing at points about midway of the length of the slots and adjacent to each side of the machine. At their free ends said arms are provided with pivot-apertures $v'$, with which are engaged the hinge lugs or ears $v^2$ of a metal plate V', said ears being arranged in the opposite ends of the plate adjacent to one of the side margins of the latter. The length of the pivot-arms V is such as to permit the plate to depend vertically in front outside of the casing when the arms are turned forwardly, as indicated in Fig. 3, and, on the other hand, when the arms are turned over into a horizontal position toward the rear, as indicated in dotted lines in said figure, to permit the plate to lie flat upon the key-bank, so as to cover the key-slots therein. The width of the plate is such as to cover the key-slots throughout their full length, less the width of one of the upturned ends of a key-bar at each end, so that the said plate may be brought into position when part of the keys are pulled out and part remain at their normal inward position.

In order to lock the plate when in this latter position, it is provided upon its under side with eye-lugs $v^3$, which are adapted to enter apertures $v^4$ in the casing and operable by means of a key inserted through keyholes $v^5$. It will be obvious that when the plate is thus locked in position it will be impossible to shift any of the keys in either direction. At the same time the plate serves as a closure for the key-slots to prevent the access of dust or dirt when the machine is not in use.

The operation of the machine has been sufficiently indicated in the foregoing description to render the same clear and need not therefore be repeated. It may be stated, however, that the record produced on the machine will appear in the form of vertical columns, as indicated in fragmentary view, Fig. 13, the day of the week and the part of the day appearing in the first left-hand column and the records of each of the workmen appearing in a line transversely opposite. When the workmen all pass in before any go out, and vice versa, the records of all of the workmen will appear in separate transverse lines, as shown in Fig. 13; but should the workmen be permitted to pass in and out promiscuously the transverse lines will be broken, owing to the moving forward of the recording-sheet each time a key is moved in a direction opposite that of the last preceding key. The date-marks in the first left-hand column, however, will serve to indicate clearly what portion of the recording-sheet belongs to any particular day or part of a day, inasmuch as these characters will be repeated each time the sheet is moved forward until the dating characters are changed at each end each twelve hours, as hereinbefore described. It will therefore be obvious that all of the records which are transversely opposite any given date in the dating-column will have been produced within that period.

I claim as my invention—

1. In a time-recorder, the combination with a main shaft and a plurality of type-wheels mounted side by side thereon, of ribbon-supports arranged to extend horizontally between the peripheries of said type-wheels, the upper edges of said supports being arranged to rise slightly above the peripheries of the type-wheels so as to support the ribbon normally free from type-wheels.

2. In a time-recorder, the combination with a main shaft and a plurality of type-wheels mounted thereon, of a ribbon-supporting bar arranged to extend horizontally above and adjacent to the peripheries of said type-wheels, said bar being provided with an opening or space through which the peripheries of the several type-wheels are arranged to project, and connecting cross or guide bars extending across said opening between the type-wheels, adapted to support the ribbon free from the type-wheels, the upper edges of said cross-bars being made knife-edged to form scoring devices.

3. In a time-recorder, the combination with a plurality of individual impressing devices and a shiftable key-bar for each of a recording-sheet and mechanism adapted to move said recording-sheet each time only a key is shifted in a direction opposite that of the last preceding key and a dating mechanism arranged to make an impression once only each time the recording-sheet is moved, comprising a revoluble type-wheel arranged with its periphery adjacent to the recording-sheet, a spring-pressed impressing-hammer, a rock-bar arranged to extend transversely of the set of key-bars and adapted to be oscillated by each one of the latter, a tappet-arm mounted on said rock-bar and a toggle connected at one end with the rock-bar and arranged to be flexed by said tappet-arm to lift the impressing-hammer against the action of its spring and permit it to fall each time the recording-sheet is moved.

4. In a time-recorder, the combination with the printing-forms, the inking-ribbon and recording-sheet and the impressing-hammers adapted to force the ribbon and recording-sheet against said printing-forms, of a cushioning-strip of felt or the like interposed between the faces of the impressing-hammers and the printing-forms and adapted to render the impressions more uniform.

5. In a time-recorder, the combination with a plurality of type-wheels arranged in pairs, the inking-ribbon and recording-sheet and a plurality of impressing-hammers, each provided with an impressing-face adapted to act upon both members of a pair of type-wheels simultaneously, of a cushioning-strip of felt or the like, interposed between the faces of the hammers and the said type-wheels and adapted to render the impressions more uniform.

6. In a time-recorder, the combination with a plurality of key-bars arranged in the same plane with each other, of a locking bar or plate adapted to engage each of the several key-bars when at either limit of their throw, and means for locking said bar in this position.

7. In a time-recorder, the combination with a plurality of horizontally-arranged shiftable key-bars, having a uniform throw or reciprocatory movement arranged in the same plane with each other and each provided with a projection, of a locking bar or plate adapted to be locked in position in the path of the said projections of the key-bars so as to hold the latter at either limit of their throw.

8. In a time-recorder, the combination with a plurality of horizontally-arranged shiftable key-bars, having a uniform throw, arranged in the same plane with each other and each provided with an upturned end arranged to project out through a slot in the casing, of a locking bar or plate adapted to overlie said slots and occupy the space between the opposite limits of throw of the key-bars, parallel pivoted arms arranged to support said bar out of, and to guide it into, operative position and means for locking the bar in operative position.

9. In a time-recorder, the combination with a plurality of printing-forms and a pivotally-mounted spring-pressed impressing-hammer for each form, of mechanism for actuating each impressing-hammer comprising a reversible cam-block movably mounted upon the impressing-hammer, an actuating-lever pivotally mounted between its ends and provided at one end with a projection adapted to act upon the cam to lift the hammer against the action of its spring when oscillated in either direction, and arranged to extend at its opposite end adjacent to a shiftable key-bar and a projection or stub on said key-bar adapted to engage the end of the actuating-lever in the to-and-fro movement of the key-bar.

In witness that I claim the foregoing as my invention I affix my name in the presence of two subscribing witnesses.

JOHN W. DEÜBNER.

Witnesses:
HENRY W. CARTER,
ALBERT H. GRAVES.